United States Patent [19]
Shah et al.

[11] Patent Number: 5,558,824
[45] Date of Patent: Sep. 24, 1996

[54] GAS-ASSISTED PLASTICS INJECTION MOLDING WITH CONTROLLED MELT FLOW AND METHOD OF CONTROLLING MELT FLOW

[75] Inventors: Suresh D. Shah, Troy; Carl H. Visconti, Clarkston, both of Mich.

[73] Assignee: General Motors Corporation, Detroit, Mich.

[21] Appl. No.: 247,373

[22] Filed: May 23, 1994

[51] Int. Cl.⁶ .................. B29C 44/10; B29C 45/18; B29C 45/77
[52] U.S. Cl. .................. 264/40.3; 264/85; 264/572; 425/130; 425/149; 425/170
[58] Field of Search .................. 264/40.3, 85, 500, 264/572; 425/130, 149, 170

[56] References Cited

U.S. PATENT DOCUMENTS

| | | | |
|---|---|---|---|
| 3,268,635 | 8/1966 | Kraus et al. | 264/500 |
| 4,101,617 | 7/1978 | Friederich | 264/572 |
| 4,153,231 | 5/1979 | Hayakawa et al. | 249/82 |
| 4,479,914 | 10/1984 | Baumrucker | 264/40.3 |
| 4,942,006 | 7/1990 | Loren | 264/85 |
| 4,952,365 | 8/1990 | Shibuya et al. | 264/40.3 |
| 5,030,076 | 7/1991 | Ebenhofer et al. | 264/572 |
| 5,098,637 | 3/1992 | Hendry | 264/572 |
| 5,198,238 | 3/1993 | Baxi | 425/130 |
| 5,441,680 | 8/1995 | Guergov | 264/572 |

FOREIGN PATENT DOCUMENTS

| | | | |
|---|---|---|---|
| 55-113539 | 9/1980 | Japan | 264/85 |

*Primary Examiner*—Catherine Timm
*Attorney, Agent, or Firm*—George A. Grove

[57] ABSTRACT

Tooling and method for gas assist injection molding of plastics material into a hollowed part in which a mold chamber formed between stationary and movable mold tools is initially charged with an inert gas to provide a resistance force against the flow front of a short shot of plastics melt subsequently injected into the cavity and supplied with a pressurized assist gas so that the velocity of the flow front of the short shot expanded by the assist gas in the mold chamber is modulated by the controlled release of the retarding chamber charge gas to prevent blow out of the short shot while eliminating flow hesitation lines to improve molded part appearance and uniformity of part wall thickness.

7 Claims, 3 Drawing Sheets

GAS-ASSISTED PLASTICS INJECTION MOLDING WITH CONTROLLED MELT FLOW AND METHOD OF CONTROLLING MELT FLOW

TECHNICAL FIELD

This invention relates to a method and apparatus for the gas-assisted injection molding of a short shot of plastics melt into a hollow part and more particularly to new and improved gas assist tooling and method of molding plastics in which the velocity of the plastics melt filling the mold forming chamber is controlled to enhance complete melt packing of the cavity while minimizing flow hesitation lines in the melt to optimize part acceptability from functional and appearance standpoints.

BACKGROUND OF THE INVENTION

Prior to the present invention, a wide range of plastics injection molding constructions and methods have been disclosed. U.S. Pat. No. 5,198,238, issued Mar. 30, 1993, discloses a gas assist molding device in which separable mold tooling defines a forming chamber of cavity in which a short shot of heated plastic material is injected. Subsequently, a gas injection pin inserted into the plastic material is activated so that it feeds pressurized gas into the melt to force and pack the heated plastics against the cavity wall until the material sufficiently hardens. The assist gas is subsequently discharged through the pin. U.S. Pat. No. 5,098,637, issued Mar. 24, 1992, discloses a process of injection molding a hollow plastics article with an assist gas that is introduced upon completion of plastic injection, and the gas assist is maintained for controlled purge of the plastics into a spill reservoir until the plastics solidifies. U.S. Pat. No. 4,153,231, issued May 8, 1979, discloses a mold assembly for foam molding of plastics material in which the mold forming chamber is charged with pressurized gas to suppress foaming of subsequently introduced plastics material until a skin is formed on the cavity wall surface. After such skin formation, a die is moved to an expanded position so that the material in the cavity is allowed to foam.

SUMMARY OF THE INVENTION

The present invention is in the general category of the above-identified patents but provides a new and improved gas assist plastics injection molding apparatus and method in which an initial charging gas is injected into the mold cavity to provide a resisting force to the flow front of a short shot of heated plastics material which is expanded by an interior assist gas which expands the short, shot to fully contact the walls of the chamber. By controlling the rate of exhaust of the initial chamber charging gas, the flow front and expansion rate of the short: shot is modulated to provide a smooth plastics flow in the cavity to minimize flow hesitation marks in the molded part and to ensure there are no blow holes in the short shot and the molded part has a more uniform wall thickness.

The expansion rate: of the plastics melt can be controlled by automated monitoring and modulating the pressures of the expansion gas inside of the melt and the retarding gas inside of the mold chamber for improving part appearance and strength. A microprocessor receiving gas pressure signals from gas expanding the plastics melt and from the precharged mold chamber calculates an optimized flow rate for the plastics filling the chamber and effects control flow rate by controlling exhaust and pressure of the precharge gas in the chamber.

These and other objects features, objects and advantages of the present invention will become more apparent from the following detailed description and drawing in which:

DESCRIPTION OF THE PREFERRED EMBODIMENT

Figure 1:
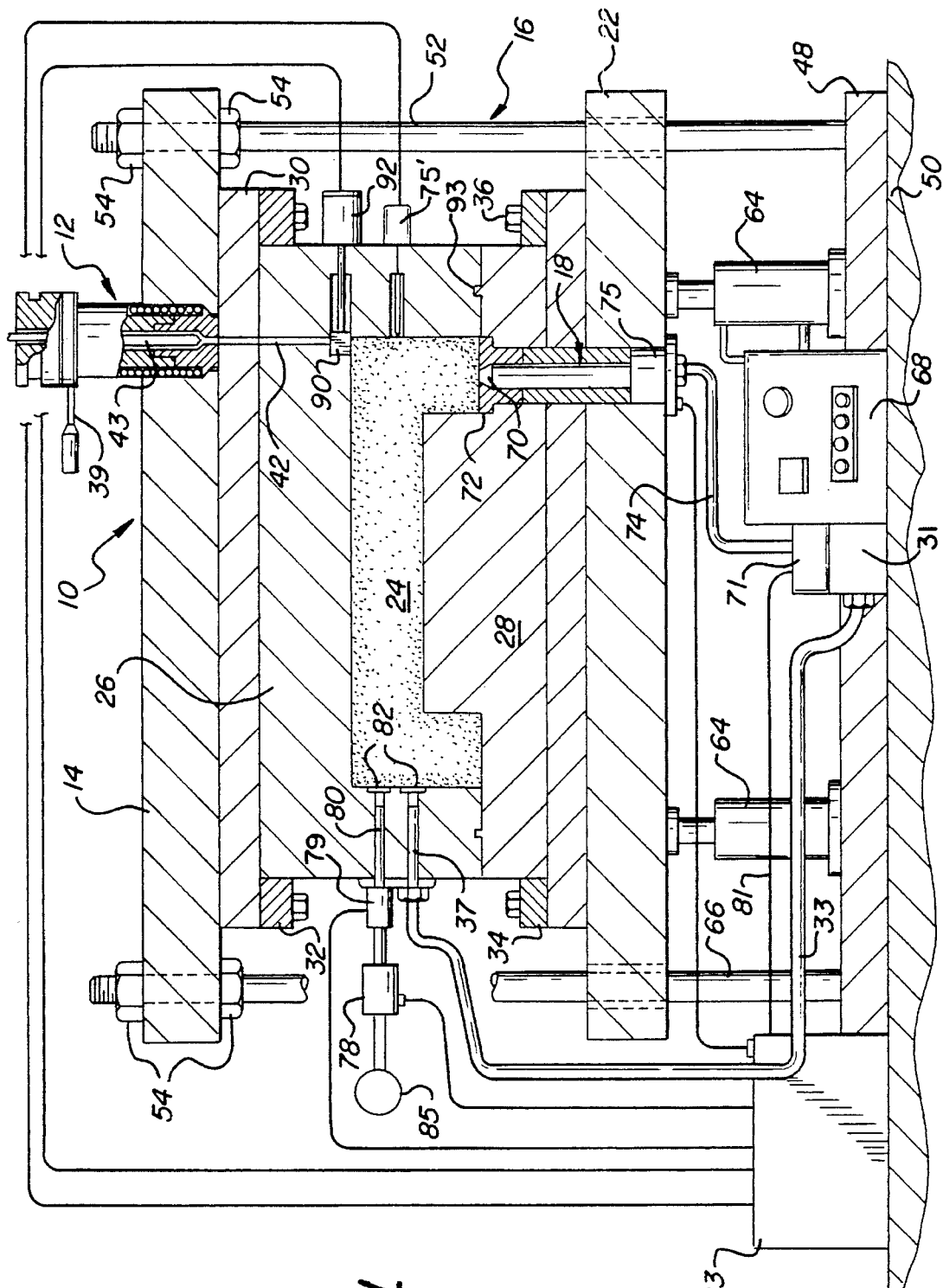
FIG. 1 is a diagrammatic view generally in cross-section of a gas-assisted plastics injection molding equipment and controls therefor.

Turning now in greater detail to the drawings, there is diagrammatically shown in FIG. 1 gas-assisted plastic injection molding equipment 10 comprising a plastics injector unit 12 operatively connected to a fixed platen 14 of a press unit 16 and a gas injector 18 operatively mounted in a support plate 20 fixed to a movable platen 22 of press 16.

The plastics injector unit 12 is utilized to inject quantities of viscous polyester polycarbonite with glass fibers or other material suitable for injection as a "short shot" that may be up to 90 percent or more of the total volume of a profiled mold chamber 24. As shown, the mold chamber 24 is provided by upper and lower mold tool halves 26, 28 operatively mounted on the platens by support plates 20 and 30 and by support rings 32 and 34. Threaded fasteners 36 are employed to secure the support rings and support plates to the platens.

Figure 2:
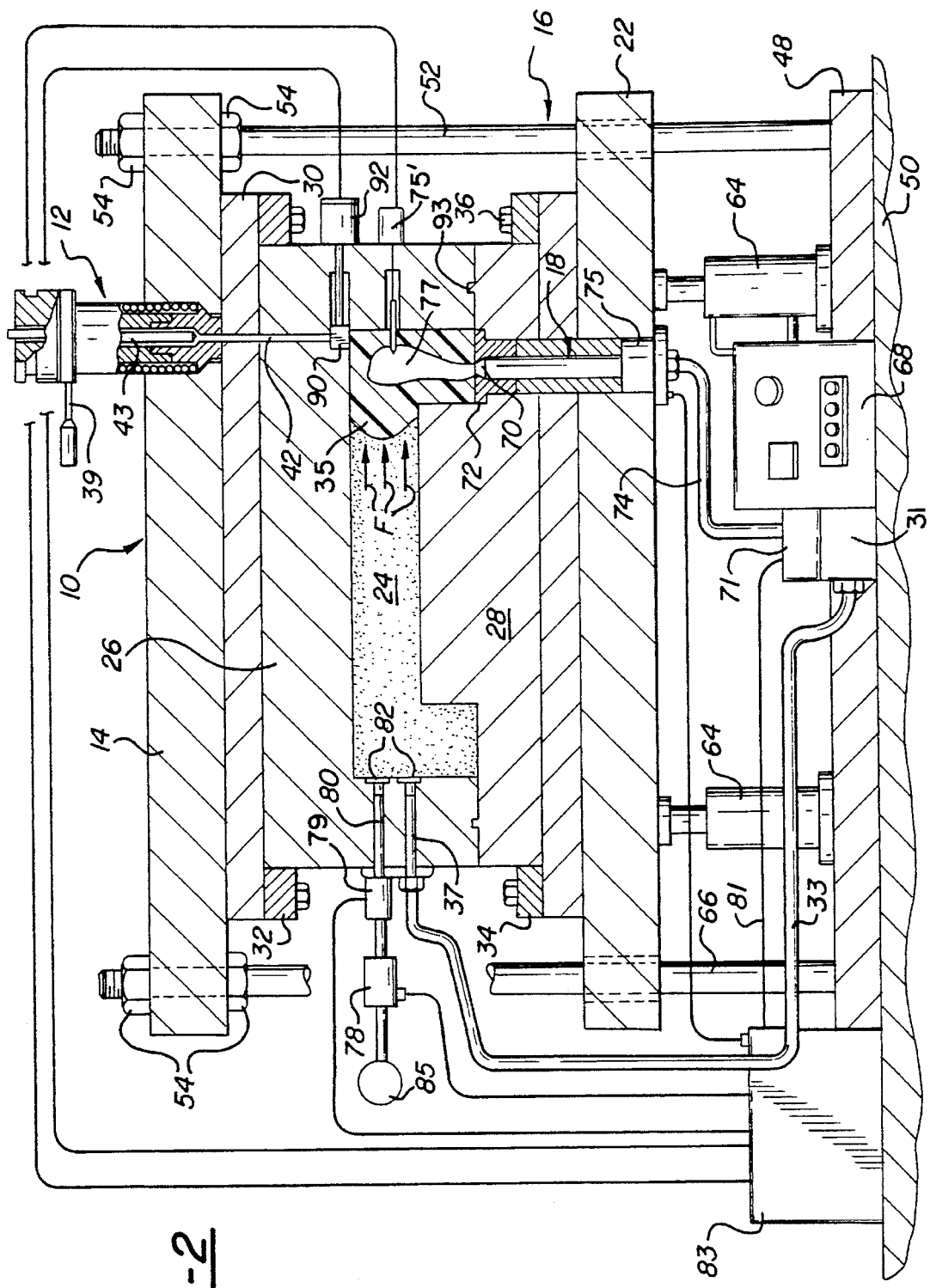
FIG. 2 is a diagrammatic view similar to the FIG. 1 view illustrating a phase of the gas assist molding operation.

As will be further explained below, the closed chamber 24 is initially supplied with pressurized inert gas such as nitrogen from pump 31 and line 33 through a gas injector 37. This initial gas charge is prior to the injection of the short shot of plastics melt shown at 35 in FIG. 2 by the plastics injector melt.

The plastics injector unit 12 receives plastics material from a source, not shown, through intake 39, and a short shot of plastics is injected under controlled pressure by the plastics injector unit 12 that has heating coils therein that heat and maintain melt temperature as it is fed by the injector unit into the runner 42 formed in the support plate 30 and the upper mold 26. The centralized control rod 43 of the plastics injector unit is adjustable to control the outlet opening in the plastics injector unit and to regulate and selectively block the flow of plastics melt through the injector.

The molding equipment 10 further comprises a base 48, mounted to a support 50, which has a plurality of tie rods 52 extending therefrom through bushings in the movable rectilinear platen 22 to threaded terminal ends which extend through and which are secured to the stationary platen 14 by hex nuts 54.

The lower molding; tool half 28 is mounted on movable platen 22 and is moved therewith by the controlled action of hydraulic cylinders 64. These cylinders are supported on the base plate 48 and have movable pistons therein with piston rods 66 having terminal ends that connect to the lower platen 22 for moving the platen 22 on the tie rods for opening and closing the mold tooling.

Controls in operations panel 68 are selectively employed to control the feeding and discharge of pressure oil employed by the cylinders 64 to open and close the mold tooling so that the mold can be closed and the chamber 24 supplied with precharge or flow control gas and then with the short shot 35 of plastics melt for gas-assisted molding as explained below. After the part has been molded, the cylinders move the tooling to an open position so that the molded part can be ejected with conventional ejector pins or other devices, not shown.

The gas injector 18 comprises an elongated gas injector pin which terminates in a conical nozzle 70 that in a gas injection position fits in a mating conical recess of a nozzle seat 72 mounted in the lower mold. While gas injector 18 is fixed in the mold tooling in a preferred embodiment of this invention, a retractable unit may be employed. With a retractable unit, the injector may be moved between a forward, gas inject position and a retracted, gas exhaust position by operation of an actuator, such as disclosed in U.S. Pat. No. 5,364,252, issued Nov. 15, 1994, assigned to the assignee of this invention and hereby incorporated by reference.

To expand the short shot 35, pressurized inert gas from a gas supply, not shown, is pumped by pump 31 to the gas injector 18 through a control valve 71 and flexible line or hose 74 to establish and expand the interior chamber 77 of the short shot. The control valve 71 has an exhaust, and the valve is operative to exhaust gas from the interior of the plastics part after the part has been molded in chamber 24. A first gas pressure sensor 75 supported on platen 22 is operatively connected between the hose 74 and gas injector 18 to sense the gas pressure in the short shot 35. Pressure signals from this sensor and from sensor 75. can be employed with other pressure signals to input a microprocessor 83 to control gas assist plastics injection molding operations.

As diagrammatically illustrated in the Figures, the nozzle seat opens at its center to pneumatically communicate with the mold chamber 24 formed in the lower mold tool so that the: short shot of plastics material can be injected with pressurized expansion gas through gas injector 18 after the mold chamber has been initially gas charged through gas injector 37.

Adjacent to the gas injector 37 for initially charging the mold chamber, the mold tooling has a gas exhaust passage 80 in the upper tool and at an end of the mold chamber 24 remote with respect to the discharge end of the plastics runner 42 in the tooling so that the flow control gas can be readily released from the chamber through a control valve 78 connected outboard of the passage 80. A mold chamber pressure sensor 79 is operatively connected between the control valve 78 and exhaust passage 80. This sensor provides a pressure signal from the flow control gas in Chamber 24 which is sent to the microprocessor 83 by circuit 85. The first pressure sensor 75 is similarly connected to the microprocessor 83 by circuit 87.

The microprocessor, connected by circuitry 81 to the controls 68, is programmed to respond to pressure differential readings in the melt and in the chamber 24 to control the exhaust valve 78 and thereby vary the gas exhaust from chamber 24 and the pressure therein to control the velocity of the flow front of the plastics melt. This control of flow rate preferably is such that plastics hesitation marks are not produced. Gas transmitting plugs 82 of porous material are placed in the inboard ends of the passage 80 and the gas injector 37 so that the plastic material will not enter into these parts during molding. Exhaust valve 78 moves at varying positions between gas delivery and gas exhaust positions and is connected to microprocessor 83 so that the microprocessor can signal this valve to block its exhaust during feed of pressurized gas into chamber 24 and to vary and control the exhaust opening to control the exhaust of gas during a molding operation.

A movable gate 90 is positioned at the end of runner 42 to seal the chamber 24 so that the chamber 24 can be initially charged with gas by the gas injector 37. After such gas charging, the gate can be automatically operated by signal from the microprocessor. Accordingly, the gate 90 can be retracted by a solenoid or by hydraulic or pneumatic cylinder 92 operatively connected to the controls or microprocessor 83 so that the heated plastics melt can be injected as a short shot into the chamber by the injector 12.

With this invention, the controls are operated by the programmed microprocessor so that the gas injector 37 injects pressure gas into the chamber when the mold tooling is in a closed position and the chamber is sealed by annular seal 93 at the tooling interface. This sealing is further augmented by moving the gate 90 to a sealing position in which the inlet for the plastics material from the plastics injector is blocked. Also, the exhaust control valve 78 is closed and the chamber 24 is completely sealed.

In the preferred operation of this invention, improved molding with uniform constant velocity of the melt is provided by the program of the microprocessor and controls to fill the injection mold with an inert chamber charging gas by the gas injector 37. The short shot 35 is then supplied into the chamber and expansion gas or assist is fed to the hot interior of the short shot of plastics melt through gas injector 18. The pressures within the short shot and the chamber are sensed by the two pressure sensors 75 and 79 and monitored by the microprocessor 83 which when appropriate provides signals to control the degree of opening of the exhaust valve 78 to control the venting of the mold chamber control gas. The pressure of this gas is initially slightly higher than the molding gas which is subsequently injected by the gas injector 18 into the short shot during the gas injection molding phase. After the plastic short shot of melt is injected, the inert chamber control gas is subsequently vented under a controlled rate from the tooling through the exhaust valve 78 to reduce the chamber charging pressure in a controlled manner so that the plastics melt can flow into the chamber as determined by the microprocessor during the injection mold phase. With the controlled venting of the inert gas from the mold chamber and with the expansion charge of gas injected into the heated viscous interior of the short shot, the short shot begins to expand preferably with uniform melt velocity. The velocity of the flow front of the melt is modulated by the resistant force of the gas exerted thereon illustrated by force arrows F shown in FIG. 2.

Under such condition, the plastics material flows with a more uniform velocity and packs with improved uniform thickness against the walls of the cavity.

Figure 3:
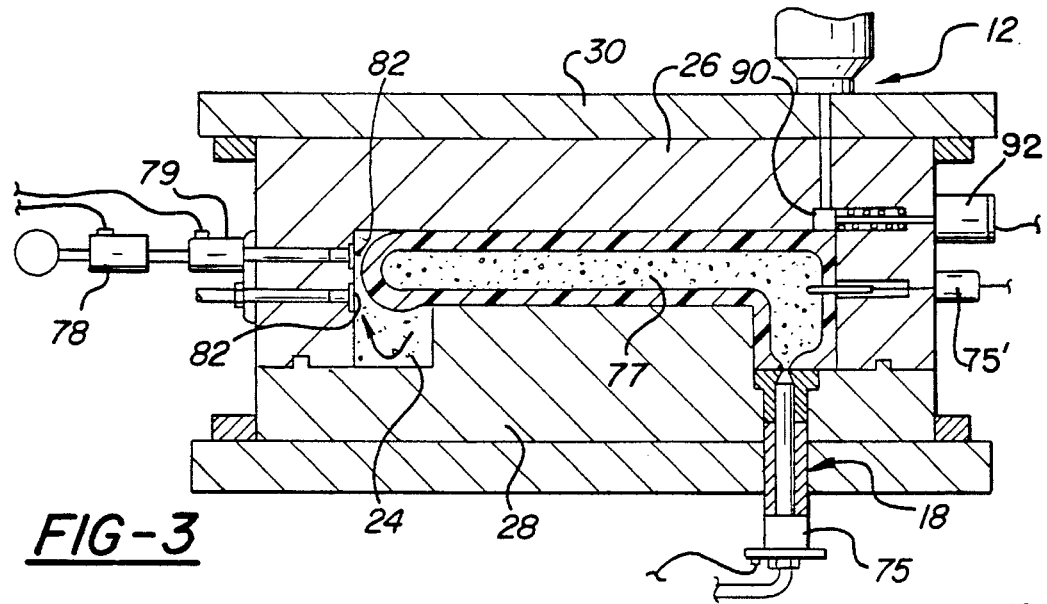
FIGS. 3 and 4 are views similar to the view of FIG. 2 illustrating subsequent operations of the gas-assisted injection molding equipment according to this invention.
Figure 4:
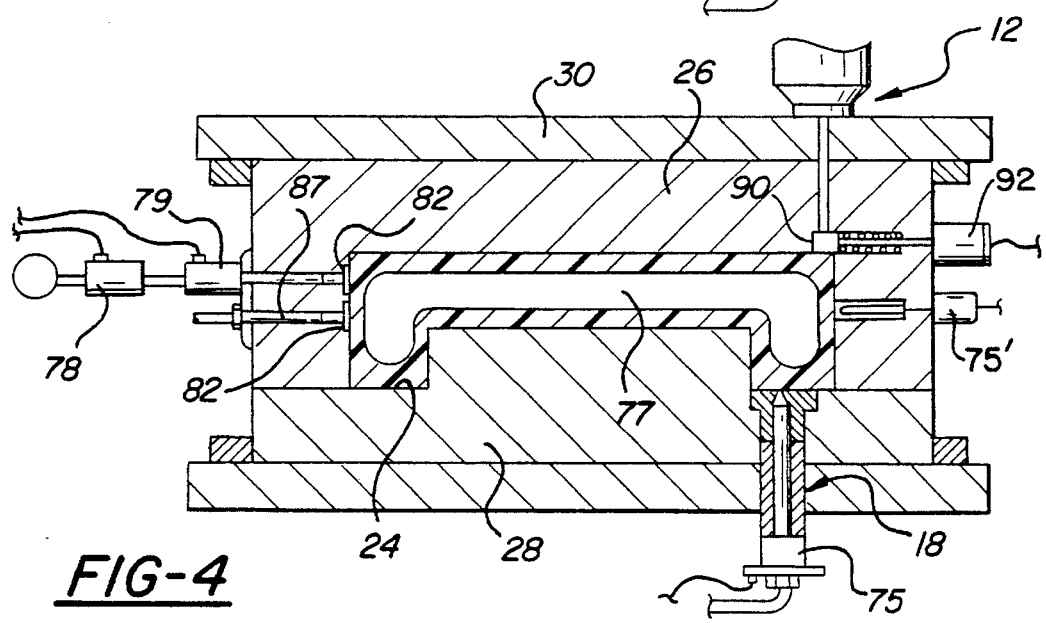
Figure 5:
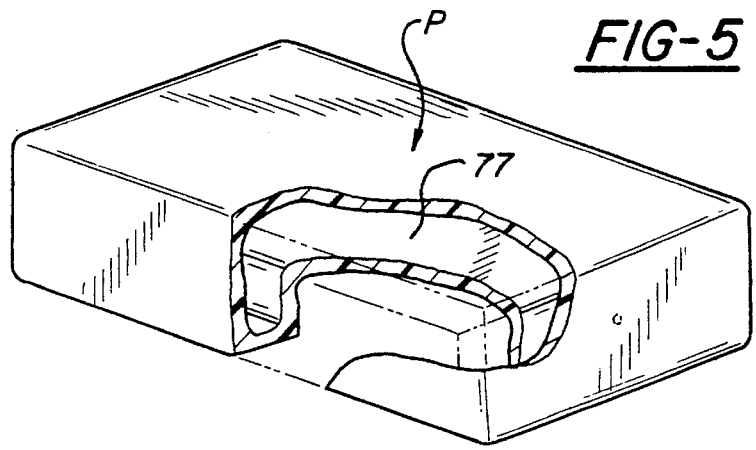
FIG. 5 is a pictorial view with portions broken away of a part molded in accordance with the present invention.

In FIG. 1, the valve 78 is closed so that the charging gas can fill the mold chamber through injector 37. The valve 78 is cracked in FIG. 2 so that the pressure of the gas in the mold chamber is slightly reduced to allow the progressive filling of the chamber by the short shot 35 with retardation of the velocity of the flow front by the resisting force of chamber gas represented by arrows F. In FIGS. 3 and 4, the valve 78 is further opened to control the rate of exhaust of the control gas and the rate of melt flow in filling the chamber and to finally exhaust all of the control gas from the mold chamber.

After the controlling gas is vented and the short shot has filled the entire chamber as shown in FIG. 4, the gas pressure in the formed short shot is maintained until the part P is sufficiently cooled to allow internal venting. At this time, the control valve 71 is actuated so that the assist gas is vented to a gas chamber or to atmosphere. Subsequently, the mold tooling is opened and hollowed part P is sufficiently cooled so that it can be ejected from the tooling.

In this invention, the improved control of melt flow velocity during gas assist injection molding provides design part flexibility while reducing tool modification while eliminating thin walls and gas breakthrough. With the retarding force F of the chamber charge gas resisting the movement of the flow from, surface flow or hesitation marks are eliminated when desired to provide a high quality part with improved finished surfaces and no weakened or gas-penetrated wall sections.

While a preferred embodiment of the invention has been shown and described, other embodiments will now become apparent to those skilled in the art. Accordingly, this invention is not to be limited to that which is shown and described but by the following claims.

The embodiments of the invention in which an exclusive property or privilege is claimed are defined as follows:

1. A method of gas assist injection molding of a quantity of plastics melt into a hollow stabilized plastics article with minimized plastics flow hesitation lines comprising the steps of:

a. pressurizing a profiled mold chamber within mold tooling with an inert charging gas, b. injecting a short shot of heated plastics melt having a volume less than the volume of said chamber into said chamber while displacing said pressurized charging gas by said short shot of plastics melt, c. injecting pressurized molding assist gas into said short shot of plastics melt within said chamber to form a cavity within said short shot and continuing said assist gas injection to expand said cavity within said short shot and thereby force said plastics melt of said short shot to expand against the opposing forces of said charging gas within said chamber, d. releasing said charging gas from said chamber at a rate to modulate the rate of expansion of said short shot of plastics melt within said chamber, said rate selected to minimize plastics flow hesitation lines of said expanding short shot, said releasing continuing until said plastics melt fully forms as a wall against the profile of said mold chamber to complete the hollow article.

2. A method of gas assist injection molding of a quantity of plastics melt into a hollow stabilized plastics article comprising the steps of:

a. pressurizing a mold chamber within separable mold tooling with an inert charging gas, b. injecting a short shot of heated plastics melt having a volume less than the volume of said chamber into said chamber while said pressurized charging gas is displaced by said short shot of plastics melt, c. injecting pressurized molding assist gas into said heated plastics melt of said short shot within said chamber to establish a cavity within said short shot and to progressively expand said cavity thereby establishing a flow front of said melt that initiates the filling of said chamber and thereby forces said melt of said short shot to expand against the opposing force of said charging gas, d. sensing the pressure of said charging gas in said chamber and the pressure of said assist gas in said chamber of said short shot, e. controlling the molding of the hollow article by controlling pressures of said charging gas in said chamber and said assist gas in said cavity of said short shot and by releasing said charging gas from said chamber at a rate to control the pressure differential between said chamber and said cavity so that the velocity of the flow front of said expanding plastics melt of said short shot filling said chamber is modulated and the plastics material of said melt packs against the wall of said cavity without penetration of said plastics melt by said molding assist gas.

3. A method of gas assist injection molding of quantities of plastics melt into a hollow stabilized plastics article comprising the steps:

a. pressurizing a mold chamber defined by mold walls within separable mold tooling with an inert charging gas to provide a molding control force within said chamber, b. injecting a short shot of heated plastics melt having a volume less than the volume of said chamber into said chamber and having a heated viscous interior, c. injecting pressurized molding assist gas into said viscous interior of short shot to effect the establishment of an expanding cavity and to continue to expand said cavity thereby causing the volumetric expansion of said short shot in said chamber against the molding control force of said charging gas exerted on said expanding short shot, and d. releasing said charging gas from said chamber at a controlled rate thereby progressively diminishing said molding control force of said charging gas on said short shot, said rate being selected so that said short shot continues it volumetric expansion and progressively and evenly flows with minimized formation of plastics flow hesitation lines against the mold walls defining said chamber in a continuous thickened layer until a hollowed plastic article is formed.

4. Gas-assisted plastics injection mold equipment comprising separable mold tooling parts moveable between open and closed positions and defining a mold chamber therein, seal means disposed between said separable mold tooling parts to block the escape of gas from said chamber, charging gas injector means for injecting pressurized charging gas into said chamber, exhaust line means operatively connected to said chamber to vent said charging gas from said chamber, valve means connected to said exhaust line means operable to control and vary the venting of said pressurized charging gas from said chamber to progressively reduce the gas pressure therein, plastics injector means for injecting a short shot of heated plastics material into said chamber, assist gas injector means for injecting pressurized assist gas into said short shot to establish an expanding cavity in said short shot and to expand the plastics material of said short shot against the retarding force of said charging gas in said chamber thereby allowing said plastics material to progressively pack against the wall of said chamber defined in said tooling without weakened or gas-penetrated sections, first sensor means for sensing the pressures of said charging gas in said chamber, second sensor means for sensing the pressures of said assist gas in said cavity in said short shot, and control means connected to receive signals from said first and second sensor means and connected to deliver a control signal to said valve means for controlling the venting of said chamber and for reducing the pressure of said charging gas within said chamber so that a complete hollow plastic part may be formed therein.

5. The equipment defined in claim 4 wherein said gas exhaust line means is operatively connected to said chamber at a point remote from said plastics injector means and said assist gas injector means.

6. A plastics injection mold and a plastics injector and gas injector means assembly to form a hollow plastics part comprising separable mold tools which are movable between open and closed positions, said tools defining a molding chamber therein with a fixed volume when in a closed position, plastics injector means for injecting a short shot of heated plastics into said chamber and gas injector means extending into said mold tools for initially injecting a quantity of pressurized charging gas into said chamber for pressurizing said cavity and for subsequently injecting a pressurized assist gas into the interior said short shot to establish an expanding chamber therein to thereby expand said short shot in said fixed volume chamber, release valve means spaced from said injector means and operatively connected to said chamber and operable to exhaust said charging gas from said chamber at a controlled rate to modulate the pressure of the charging gas therein, first sensor means for sensing the pressure of said charging gas in said chamber, second sensor means for sensing the pressure of said assist gas in said cavity in said short shot, and controller means connected to receive signals from said first and second sensor means and connected to deliver a control signals to said release valve means to control the rate of exhaust of said charging gas from said chamber and thereby the rate of expansion of said short shot so that there are minimized plastic flow hesitation lines on the plastics part formed in said fixed volume chamber.

7. A method of gas assist plastics injection molding of a hollow plastics article in which heated plastics melt flows and forms as a wall against the profile of a fixed volume molding chamber within mold tooling to form the article comprising the steps of:

a. precharging said chamber with a quantity of pressurized inert charging gas for exerting a retarding force opposing the subsequent flow of heated plastics melt filling the cavity, b. supplying a quantity of heated plastics melt as a short shot into said chamber precharged with said inert gas, c. injecting pressurized molding assist gas into said short shot of plastics melt within said chamber to form a cavity within said short shot and continuing said assist gas injection to expand said cavity within said short shot and thereby force said plastics melt of said short shot to expand against the opposing forces of said charging gas within said chamber, d. measuring the gas pressures within said molding chamber and within said cavity of said short shot of plastics material to determine the pressure differential therebetween, and e. releasing said charging gas from said chamber at a rate to modulate the rate of expansion of said short shot of plastics melt within said chamber, said rate selected to minimize plastics flow hesitation lines of said expanding short shot, said releasing of said charging gas continuing until said plastics melt fully forms as a wall against the profile of said mold chamber to complete the hollow article.

* * * * *